US011799768B1

(12) United States Patent
Baldawa

(10) Patent No.: US 11,799,768 B1
(45) Date of Patent: Oct. 24, 2023

(54) LIGHTWEIGHT REACTIVE WORKFLOWS THROUGH INTERNAL EVENT GENERATION AND MATCHING

(71) Applicant: Amazon Technologies, Inc., Seattle, WA (US)

(72) Inventor: Rishi Baldawa, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 17/470,933

(22) Filed: Sep. 9, 2021

(51) Int. Cl.
*H04L 45/00* (2022.01)
*H04L 45/28* (2022.01)
*H04L 47/2441* (2022.01)

(52) U.S. Cl.
CPC .............. *H04L 45/38* (2013.01); *H04L 45/22* (2013.01); *H04L 45/28* (2013.01); *H04L 47/2441* (2013.01)

(58) Field of Classification Search
None
See application file for complete search history.

(56) References Cited

U.S. PATENT DOCUMENTS

| 6,212,511 B1* | 4/2001 | Fisher ................. G06F 21/6227 |
| 8,135,657 B2 | 3/2012 | Kapoor et al. |
| 10,437,653 B2 | 10/2019 | Cyr et al. |
| 2014/0165140 A1* | 6/2014 | Singla ................. H04L 63/1416 726/1 |
| 2015/0346970 A1* | 12/2015 | Holland ............. G06F 21/6281 715/765 |
| 2016/0330219 A1* | 11/2016 | Hasan ................. H04L 63/1408 |
| 2019/0265946 A1* | 8/2019 | Bae ..................... G06F 3/04883 |

* cited by examiner

*Primary Examiner* — Xavier S Wong
(74) *Attorney, Agent, or Firm* — Robert C. Kowert; Kowert, Hood, Munyon, Rankin & Goetzel, P.C.

(57) ABSTRACT

An event routing service may be used to implement lightweight reactive workflows through internal event generation and matching. The service may receive, from a client, specification of event routing rules as well as internal event rules. The internal event rules specified by the client are for matching internal events generated by the service and performing actions in response to the matching of the internal events. For example, when the event routing service determines that one of the incoming events has been successfully delivered to a target service, then the event routing service generates an internal event indicating the successful delivery. The event routing service determines that the internal event matches one of the internal event rules specified by the client. In response, the service performs an action specified by the internal event rule (e.g., send the incoming event to another target or generate a message).

20 Claims, 7 Drawing Sheets

Incoming Event 202

| Event Source | Compute Service A |
|---|---|
| Event Type | Compute Instance State Change |
| Instance ID | 71373 |
| State | Running |

FIG. 2A

Internal Event 204

| Event Source | Compute Service A |
|---|---|
| Event Type | Compute Instance State Change |
| Instance ID | 71373 |
| State | Running |
| Event Status | Matched Routing Rule |
| Matched Rule | Routing Rule X |
| Event Target | Target Y |

FIG. 2B

Internal Event 206

| Event Source | Compute Service A |
|---|---|
| Event Type | Compute Instance State Change |
| Instance ID | 71373 |
| State | Running |
| Event Status | Event Delivery Successful |
| Matched Rule | Routing Rule X |
| Event Target | Target Y |

FIG. 2C

Internal Event 208

| Event Source | Compute Service A |
|---|---|
| Event Type | Compute Instance State Change |
| Instance ID | 71373 |
| State | Running |
| Event Status | Retry Limit Reached |
| Number of Delivery Attempts | 180 |
| Last Attempt Time | 11:27:82 |
| Matched Rule | Routing Rule X |
| Event Target | Target Y |

FIG. 2D

Incoming
Event
302

| Event ID | 713 |
|---|---|
| Source ID | cloud.svc3 |
| Event Source | Compute Service A |
| Event Type | Compute Instance State Change |
| Instance ID | 123020 |
| State | Instantiated |

FIG. 3A

Internal
Event
304

| Event ID | 717 |
|---|---|
| Source ID | cloud.svc5 |
| Triggering Event ID | 713 |
| Event Source | Compute Service A |
| Event Type | Compute Instance State Change |
| Instance ID | 123020 |
| State | Instantiated |
| Event Status | Does not match a routing rule |

FIG. 3B

LIGHTWEIGHT REACTIVE WORKFLOWS THROUGH INTERNAL EVENT GENERATION AND MATCHING

BACKGROUND

As software applications become more widely used and distributed across various devices and networks, the ability for one application to communicate with other applications without being affected by failures of any other applications has become important. For example, an event routing service may be used to route events (e.g., messages that describe a change in state) from a producer application/service to one or more consumer applications/services by receiving the events from the producer and pushing them to one or more consumers, depending on event routing rules. In such an event-driven architecture, producers and consumers are decoupled, which may allow a particular producer or consumer application to be scaled and updated independently (e.g., without affecting operation of other applications).

Applications may be used in an event-driven architecture to implement a workflow by sending events/data to different targets to process data at various steps. For example, a reactive workflow may route an event from a producer service to consumer service X, then call consumer service Y, and then call consumer service Z. When a large number of events are being processed by consumer services, implementing a workflow may utilize a substantial amount of computing resources for those consumers. High-throughput workflows may lead to slower performance, delayed results, and increased resource costs for clients that use event-driven architectures to handle workflows.

BRIEF DESCRIPTION OF THE DRAWINGS

FIGS. 2A-2D illustrate examples of events that may be used when implementing lightweight reactive workflows through internal event generation and matching, according to some embodiments.

FIGS. 3A and 3B illustrate examples of events that may be used when implementing lightweight reactive workflows through internal event generation and matching, according to some embodiments.

Figure 1:
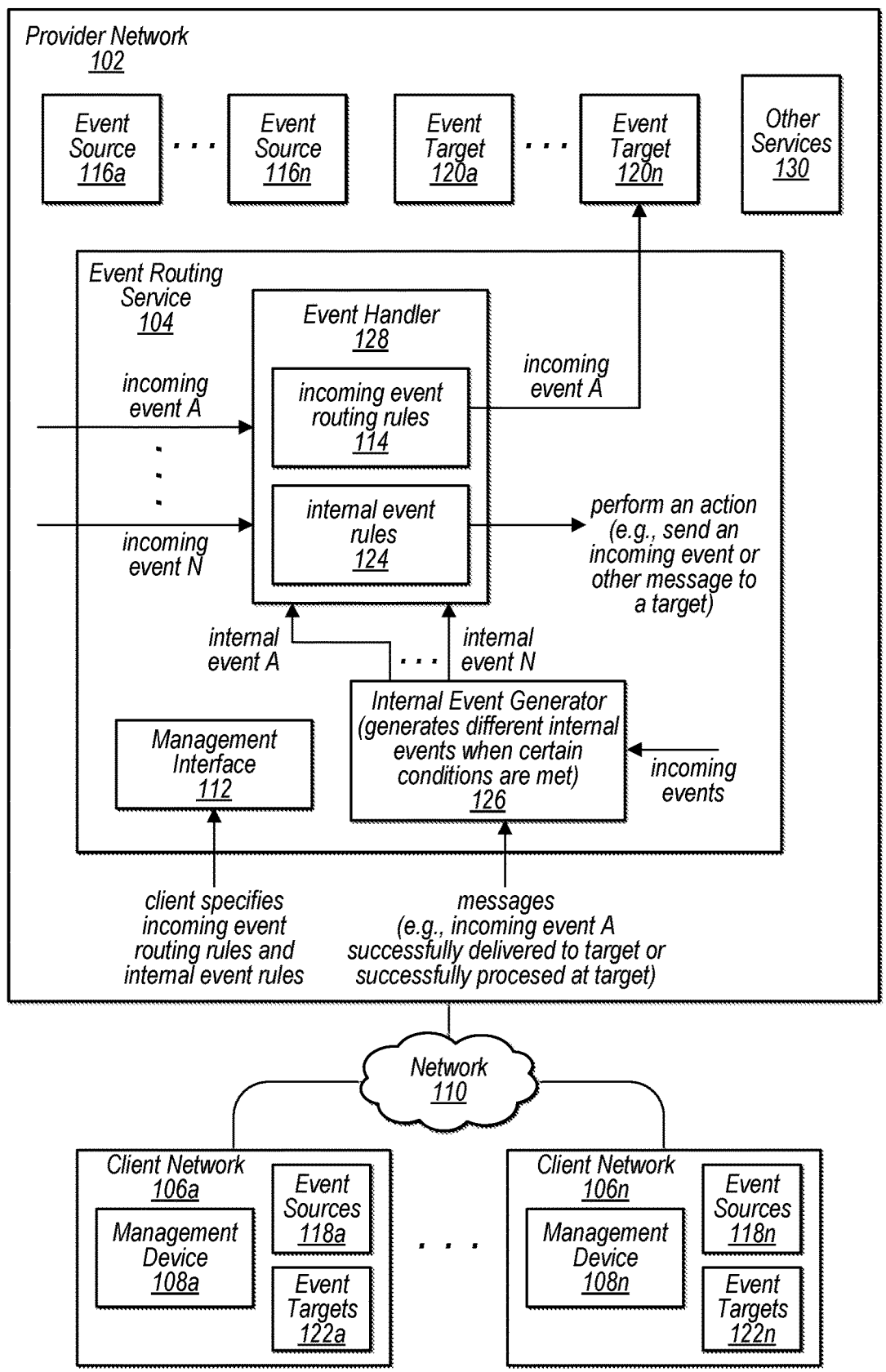
FIG. 1 is a logical block diagram illustrating a system for implementing lightweight reactive workflows through internal event generation and matching, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement lightweight reactive workflows through internal event generation and matching, according to some embodiments. In embodiments, implementing lightweight reactive workflows through internal event generation and matching may reduce the amount of time to process workflows and/or reduce the cost/amount of computing resources used to implement workflows, compared to other techniques. For example, resources of an event routing service may be used to perform some or all of a workflow instead of resources of target services, reducing delays in processing the workflow and/or reducing resource usage of the target services, which may be more costly to use than those of the event routing service.

Embodiments may allow a client to specify internal event rules in order to enable lightweight reactive workflows through internal event generation and matching. When an event routing service determines that an internal event(s) match an internal event rule, then the event routing service performs one or more actions. For example, the event routing service may trigger the next step of a workflow by sending an event or other message to one or more target services/applications.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of a system for implementing lightweight reactive workflows through internal event generation and matching. A number of different methods and techniques to implement lightweight reactive workflows through internal event generation and matching are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for implementing lightweight reactive workflows through internal event generation and matching, according to some embodiments.

In the depicted example, a provider network 102 includes an event routing service 104 that implements lightweight reactive workflows through internal event generation and matching. In embodiments, any number of remote clients of the provider network 102 may use the event routing service 104. Each client may own and/or manage a corresponding client network 106 that includes a management device 108.

The management device 108 may communicate with the event routing service 104 via a wide area network 110, such as the Internet. For example, the management device 108 may be used to send messages/commands to a management interface 112 (e.g., application programming interface) of the event routing service 104 to allow one or more users (e.g., administrators) to configure the event routing service 104 to implement lightweight reactive workflows for the client.

In embodiments, the event routing service 104 may receive, from a client via the management interface 112, a specification of incoming event routing rules 114 for matching incoming events received from one or more external sources (e.g., other services/applications external to the service 104) and sending the incoming events to respective targets (e.g., other services/applications external to the service 104). For example, a given client may any number of event routing rules 114 to route events/messages from any number of event sources 116 within the provider network and/or outside of the provider network (e.g., event sources 118 within client networks) to any number of event targets 120 within the provider network and/or outside of the provider network (e.g., event targets 122 within client networks).

In various embodiments, clients may configure event routing rules for any number of event sources or event targets within a network other than the provider network or client network (e.g., applications running on a third-party network or a stand-alone device such as a smartphone). In embodiments, any combination locations of event sources and event targets may be used by a client. For example, a client may specify an event routing rule that routes certain events from an event source at the provider network to an event target at a client network of the client, another event routing rule that routes certain events from an event source at a third-party network to an event target at the provider network, and another event routing rule that routes certain events from an event source at the provider network to an event target at the provider network. Any other combination of event sources and event targets may be used by a client for routing any number of events/types of events.

In embodiments, any number of the incoming event routing rules may be default rules provided by the event routing service. For example, the event routing service may route events of a certain type (e.g., events that contain metadata indicating a new compute instance has been instantiated at service X) from service X to service Y. In embodiments, any of number of the default rules may be overridden/replaced by a new rule specified by the client.

As shown, the event routing service 104 may receive, from the client via the management interface 112, a specification of internal event rules 124 for matching internal events generated by the event routing service (e.g., generated by the internal event generator 126) and performing actions responsive to the matching of the internal events. In embodiments, any number of the internal events may be generated in response to determining, by the service, that any number of particular conditions are met (e.g., during processing of one or more of the incoming events by the event routing service and/or other incoming messages). In the depicted embodiment, an event handler 128 may cause the event routing service 104 to perform one or more actions for the client based on the incoming event routing rules 114 and/or the internal event rules 124 that have been specified by the client and/or configured for the client.

In various embodiments, any data used by the event routing service, such as incoming events, internal events, incoming event rules, internal event rules, and other configuration data may be stored by the event routing service (e.g., in a data store/database of the service). In some embodiments, at least some of the above data may be stored by another service 130 (e.g., a data storage service implemented by the provider network).

For a given internal event rule, the event routing service may determine that one or more internal events generated by the service matches the internal event rule and in response to determining that the internal event(s) match the internal event rule, the service may perform one or more actions (e.g., sending a message to a target). Different internal events may be generated by the service, depending on the condition(s) that are met. For example, a particular internal event may be generated in response to the service determining that event A was successfully delivered from event source X to event target Y (e.g., based on receiving a message indicating successful delivery to target Y).

As another example, an internal event may be generated in response to the service determining that delivery of event A from event source X to event source Y failed (e.g., based on not receiving an acknowledgment message indicating successful delivery for a threshold time period). In embodiments, an internal event may be generated in response to the service determining that a particular incoming event(s) matches a particular event routing rule (e.g., based on receiving incoming event X and determining there is a routing rule that specifies routing event X to an event target). In some embodiments, an internal event may be generated in response to the service determining that a particular incoming event does not match any of the event routing rules (e.g., based on receiving incoming event X and determining that none of the event routing rules match incoming event X). In embodiments, an internal event may be generated in response to the service receiving one or more messages from one or more event targets or other services/applications.

In some embodiments, the event routing service 104 may receive, from the client via the management interface 112, a specification of one or more of the internal events to be generated by the event routing service (e.g., custom internal events based on client specifications). The client may specify any number of conditions at the service and/or the provider network that, in response to the service determining the conditions are met, will generate a particular internal event. For example, the client may specify that a particular internal event may be generated in response to the service receiving a message from target Y that contains certain metadata indicating an event previously sent to target Y was successfully processed (e.g., event A was received by target Y and the resulting credit card transaction was successfully processed). In embodiments, the event routing service may include any number of preconfigured (e.g., default) internal events that are each generated when different condition(s) are met and/or any number of custom internal events.

In embodiments, a client may specify a group of internal events (e.g., any number of different internal events) for an internal event rule. The service may generate each of the internal events of the group (e.g., in response to determining that incoming events each match an event routing rule). In response to determining that the group of internal events match the internal event rule, the service may perform one or more actions. In embodiments, the actions may include sending any number of incoming events and/or messages to any number of respective event targets or other applications/services external to the service and/or generating one or more new internal events.

In some embodiments, the service may receive a message (e.g., an incoming event or other message) from one of the event target or from another service/application external to the service and in response, generate an internal event. In response to the service determining that an internal event rule matches the internal event, the service may perform one or more of 1) send one or more of the incoming events to any number of the event targets and/or other services/applications and 2) send the message and/or the internal event to any number of the event targets and/or other services/applications. In embodiments, each internal event may be stored/maintained by the service for at least a threshold period of time (e.g., 1 minute, 10 minutes, 1 hour), so that it may be available to the service for sending to an event target (e.g., for any number of re-tries) and/or for sending to any other event target or external service/application (e.g., based on an internal event rule).

In various embodiments, the service may determine that a number of attempts to deliver an incoming event to one of the targets has exceeded a predetermined/configured threshold number (e.g., a retry limit) and in response, generate an internal event. In response to the service determining that the internal event matches an internal event rule, the service may determine that delivery of the incoming event has failed and/or send a notification of the failure to a destination (e.g., a user/management device).

In embodiments, the service may determine that an acknowledgment of successful delivery of one of the incoming events to one of the targets has not been received for a predetermined/configured threshold time period since the routing service sent the incoming event to the target and in response, generate an internal event. In response to the service determining that the internal event matches an internal event rule, the service may determine that delivery of the incoming event has failed and/or send a notification of the failure to a destination (e.g., a user/management device).

In some embodiments, the service may determine that no incoming events have been received by the event routing service for at least a threshold period of time (e.g., no activity has occurred for a certain period of time) and in response, generate an internal event. For example, the event routing service may send a notification based on the generation of the internal event, where the notification alerts a user/administrator that no incoming events have been received for the period of time (e.g., indicating a possible misconfiguration or error has occurred).

FIGS. 2A-2D illustrate examples of events that may be used when implementing lightweight reactive workflows through internal event generation and matching, according to some embodiments.

In various embodiments, an event may be data that describes an event that occurred, and the data may be structured and/or formatted in any number of ways (e.g., depending on the system/application being used). In the depicted example, the event fields and values for each field are shown in a simple tabular format. However, an event may be organized as any suitable data structure, object, file, etc. For example, an event may be a JavaScript Object Notation (JSON) object (e.g., a set of name-value pairs formatted according to JSON). JSON and various other formats may allow for organizing event data into different groups and/or into a hierarchical format. For example, for FIG. 2B, the Event Source and Event Type fields/data may be part of an "event" group/structure, the Instance ID and State fields/data may be part of a "detail" group/structure that is nested within the "event" group structure, and the Matched Rule and Event Target fields/data may be part of a "target" group/structure that is at the same hierarchy level as the "event" group/structure.

FIG. 2A shows an example of an incoming event 202 that may be received by an event routing service (e.g., the event handler and/or the internal event generator of the service 104 of FIG. 1). The incoming event 202 includes four fields and a value for each field. The example events depicted in FIGS. 2 and 3 show certain field and values for each field. In various embodiments, an incoming event or an internal event may include any number of fields and any number of values for each field (e.g., fields/values that are associated with event sources, the event routing service, event targets). For example, an event may include an event ID field and a source ID field, as discussed for FIG. 3.

As depicted, the incoming event 202 includes an "Event Source" field with a value of "Compute Service A" that identifies a particular service as the source that provided the incoming event 202 to the event routing service (in this example, a compute service that instantiates compute instances that are each capable of performing computations). The incoming event 202 also includes an "Event Type" filed with a value of "Compute Instance State Change" that identifies the type of the incoming event (out of multiple available event types).

The incoming event 202 also includes an "Instance ID" filed that identifies the compute instance of the particular service that the incoming event 202 is generated for. The incoming event 202 also includes a "State" filed that identifies the new state of the compute instance that caused the particular service generate and send the incoming event 202 to the event routing service (the state of instance 123020 has changed to "running").

FIG. 2B shows an example of an internal event 204 that may be generated by the internal event generator of the service 104 in response to determining that the incoming event 202 matches one of the routing rules of the service 104. The internal event 204 may include the same fields as the incoming event, as well as three additional fields: the "Event Status" with a value of "matched routing rule" that indicates the incoming event matched one of the routing rules, the "Matched Rule" field that indicates the incoming event matched the routing rule "routing rule X," and the "Event Target" rule that indicates the incoming event is e routed to "target Y" according to the routing rule "routing rule X."

Note that in the depicted example, the routing rule X may specify that any incoming events with an event type of "compute instance state change" match routing rule X. In various embodiments, a routing rule may specify any number of fields and corresponding field values (or any other data of the incoming event) of an incoming event that will result in the incoming event matching the event routing rule. For example, a particular routing rule may specify that any incoming events with an event type of "compute instance state change" and a state of "running" will match the particular routing rule.

In embodiments, the service 104 may determine that the internal event 204 matches an internal event rule and in response, perform one or more actions specified for the internal event rule. For example, an internal event rule may specify that any internal events that indicate an incoming event matched routing rule X will result in the same incoming event (or a different message) being sent from the service 104 to an additional event target. Any time the service 104 determines that an internal event (e.g., internal event 204) matches the internal event rule, the service will send the incoming event (e.g., incoming event 202) to the additional event target. This may avoid the need to modify code of target Y in order to forward the incoming event (or the different message) to the additional target.

As discussed herein, any number of actions may be performed in response to the service determining that an internal event matches an internal event rule. For example, an internal event rule may specify that one or more of the incoming events and/or other messages will be sent to any number of the event targets and/or any number of other services/applications external to the service 104 (e.g., located within the provider network, a client network, and/or a third-party network). In embodiments, an event rule may specify that any number of additional internal events may be generated in response to the service determining that an internal event matches an internal event rule. In embodiments, an internal event rule may specify any combination of two or more of the actions described herein to be performed (e.g., for any number of event sources, targets, and/or services/applications) in response to the service determining that an internal event matches an internal event rule.

FIG. 2C shows an example of an internal event 206 that may be generated by the internal event generator of the service 104 in response to determining that the incoming event 202 was successfully delivered from the service 104 to target Y. The internal event 206 may include the same fields as the incoming event, as well as three additional fields: the "Event Status" with a value of "event delivery successful" that indicates the incoming event was successfully delivered to the event target, the "Matched Rule" field that indicates the incoming event matched the routing rule "routing rule X," and the "Event Target" rule that indicates the incoming event is routed to "target Y" according to the routing rule "routing rule X."

In embodiments, the service 104 may determine that the internal event 206 matches an internal event rule and in response, perform one or more actions specified for the internal event rule. For example, an internal event rule may specify that any internal events that indicate an incoming event was successfully delivered to target Y will result in the same incoming event (or a different message) being sent from the service 104 to an additional event target Z (event target Z may be a service that records successfully delivered events). Any time the service 104 determines that an internal event (e.g., internal event 206) that matches the internal event rule, the service will send the incoming event (or a different message) to the event target Z to record the successful event delivery.

FIG. 2D shows an example of an internal event 208 that may be generated by the internal event generator of the service 104 in response to determining that the retry limit for sending the incoming event 202 to target Y has been reached (indicating failed delivery of the event). The internal event 208 may include the same fields as the incoming event, as well as four additional fields: the "Event Status" with a value of "retry limit reached" that indicates the retry limit for sending the incoming event 202 has been reached, the "number of delivery attempts" filed that indicates 180 deliveries were attempted, the "last attempt time" filed that indicates the most recent delivery attempt was made at 11:27:82, the "Matched Rule" field that indicates the incoming event matched the routing rule "routing rule X," and the "Event Target" rule that indicates the incoming event is routed to "target Y" according to the routing rule "routing rule X."

In embodiments, the service 104 may determine that the internal event 208 matches an internal event rule and in response, perform one or more actions specified for the internal event rule. For example, an internal event rule may specify that any internal events that indicate the retry limit for sending the incoming event 202 to target Y has been reached will result in a message being sent to the client/user to notify the client/user of the failed delivery. Any time the service 104 determines that an internal event (e.g., internal event 208) that matches the internal event rule, the service will send to the client/user a message to notify the client/user of the failed delivery.

FIGS. 3A and 3B illustrate examples of events that may be used when implementing lightweight reactive workflows through internal event generation and matching, according to some embodiments.

FIG. 3A shows an example of an incoming event 302 that may be received by an event routing service (e.g., the event handler and/or the internal event generator of the service 104 of FIG. 1). The incoming event 302 may be sent from the same particular service as the incoming event 202 of FIG. 2, and includes the same four fields, two of which have different values.

In mentioned for FIG. 2, in various embodiments, an event may include any number of fields. In the depicted example, the incoming event 302 includes an Event ID field with a value of "713" that uniquely identifies the incoming event 302 with respect to any other events (e.g., incoming events and/or internal events). The incoming event 302 also includes a Source ID field that uniquely identifies the source of the incoming event 302 with respect to any other sources of events. For example, cloud.svc3 may identify a network address for one or more servers that host a group of compute instances of the service "Compute Service A."

The incoming event 302 also includes an "Event Source" field with a value of "Compute Service A" that identifies the particular service as the service (e.g., the source service) that provided the incoming event 302 to the event routing service and an "Event Type" filed with a value of "Compute Instance State Change" that identifies the type of the incoming event (out of multiple available event types).

The incoming event 302 also includes an "Instance ID" filed that identifies the compute instance of the particular service that the incoming event 302 is generated for. As shown, the incoming event 302 comes from an instance with an identifier of "123020," whereas the incoming event 202 came from another instance with an identifier of "71373." The incoming event 302 also includes a "State" filed that identifies the new state of the compute instance that caused the particular service generate and send the incoming event 302 to the event routing service (the state of instance 123020 has changed to "instantiated").

FIG. 3B shows an example of an internal event 304 that may be generated by the internal event generator of the service 104 in response to determining that the incoming event 302 does not match any of the routing rules of the service 104. In the depicted example, the internal event 304 includes the same fields as the incoming event 302, as well as two additional fields: the "Event Status" with a value of "does not match a routing rule" that indicates the incoming event does not match any of the routing rules, and the "Triggering Event ID" field that identifies the incoming event of FIG. 3A (event ID 713) as the event that triggered the generation of the internal event 304.

As shown the event ID field has a value of "717" that uniquely identifies the event 304 and a source ID field that has a value of "cloud.svc5" that uniquely identifies the source of the internal event 302 with respect to any other sources of events. For example, cloud.svc5 may uniquely identify a network address for one or more servers that host the internal event generator 126 and/or the event routing service 104. In embodiments, the Event ID, Source ID, and Triggering Event ID fields may provide a way for a user or software (e.g., tracing/debugging software) to link one event to one or more other events or to link one event source to another event source.

In embodiments, the service 104 may determine that the internal event 304 matches an internal event rule and in response, perform one or more actions specified for the internal event rule, as described herein. For example, an internal event rule may specify that any internal events that indicate an incoming event does not match any routing rules will result in a message being sent from the service 104 to a user/client at a client network that indicates there was no match. Any time the service 104 determines that an internal event (e.g., internal event 204) matches the internal event rule, the service will send a message to the user at the client network that indicates no match (as described herein, any other combination of one or more actions may be performed instead, depending on the specification of the internal event rule).

Figure 4A:
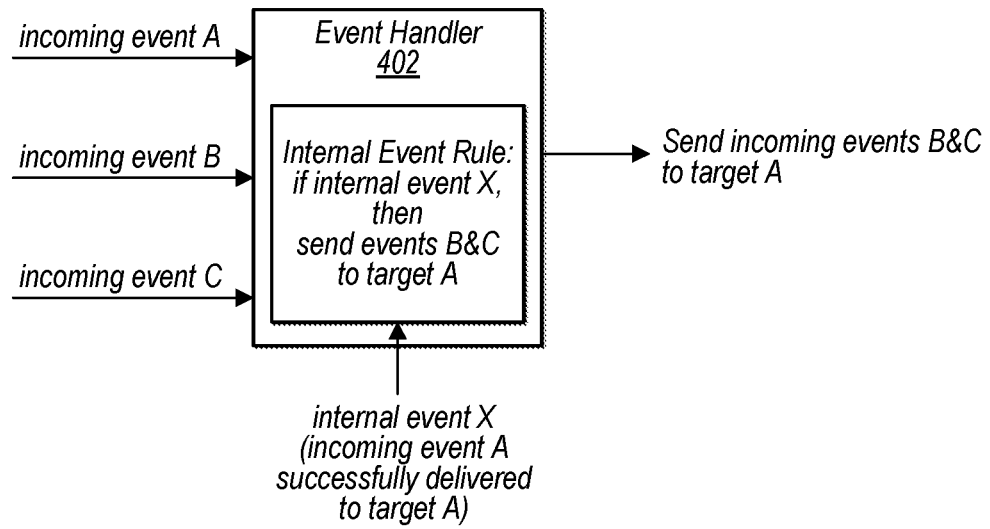
FIGS. 4A and 4B illustrate examples of internal event rules that may be used to perform actions when implementing lightweight reactive workflows through internal event generation and matching, according to some embodiments.
Figure 4B:
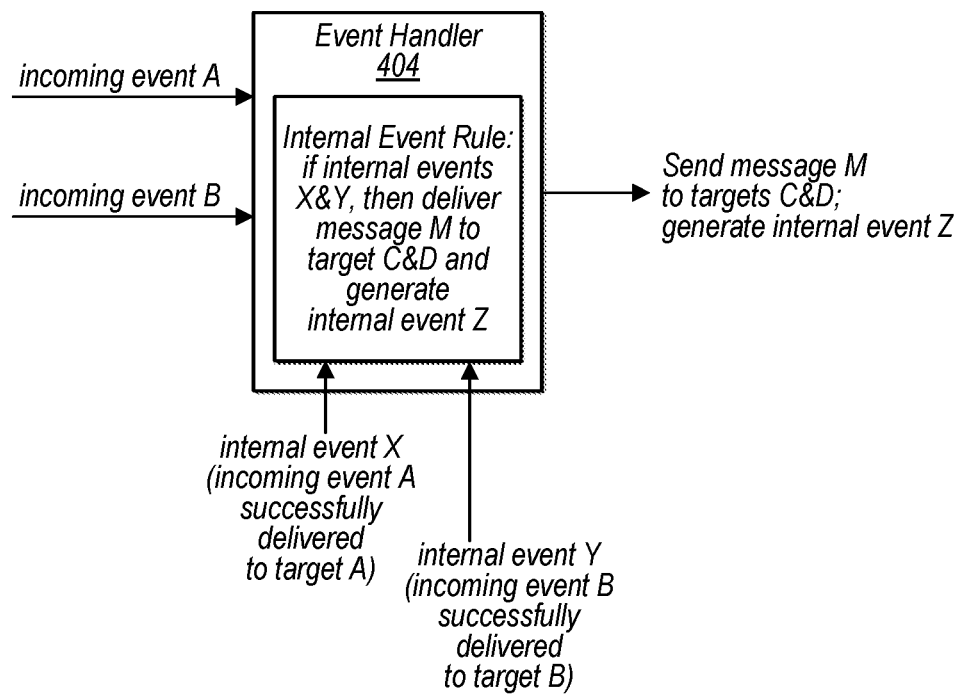

FIGS. 4A and 4B illustrate examples of internal event rules that may be used to perform actions when implementing lightweight reactive workflows through internal event generation and matching, according to some embodiments.

As shown in FIG. 4A, an event handler 402 of an event routing service may have an internal event rule that specifies if internal event X is generated, then send incoming event B and incoming event C to target A. In the example, internal event X is generated when the service determines that incoming event A has been successfully delivered to target A (e.g., in response to receiving a message from target A indicating the successful delivery).

The event handler may determine that internal event X has been generated (e.g., by receiving internal event X and/or detecting the generation of internal event X) and in response, perform the action(s) specified for the internal event rule. Therefore, the event handler/service will send incoming events B and C to target A. In some embodiments, the service may wait until events B and C are received if they have not yet been received (or wait at least a threshold time period before indicating the action(s) specified by the internal event rule could not be performed).

As shown in FIG. 4B, an event handler 404 of an event routing service may have an internal event rule that specifies if internal events X and Y are generated, then deliver message M to targets C and D and also generate internal event Z. In the example, internal event X is generated when the service determines that incoming event A has been successfully delivered to target A (e.g., in response to receiving a message from target A indicating the successful delivery) and internal event Y is generated when the service determines that incoming event B has been successfully delivered to target B (e.g., in response to receiving a message from target B indicating the successful delivery).

The event handler may determine that internal events X and Y have been generated (e.g., by receiving internal events X and Y and/or detecting the generation of internal events X and Y) and in response, perform the action(s) specified for the internal event rule. Therefore, the event handler/service will deliver message M to targets C and D and also generate internal event Z. FIGS. 4A and 4B are just examples of some types of internal event rules. In various embodiments, an internal event rule may specify any of one or more combinations of any number of internal events that cause the service to perform any number of actions.

Figure 5:
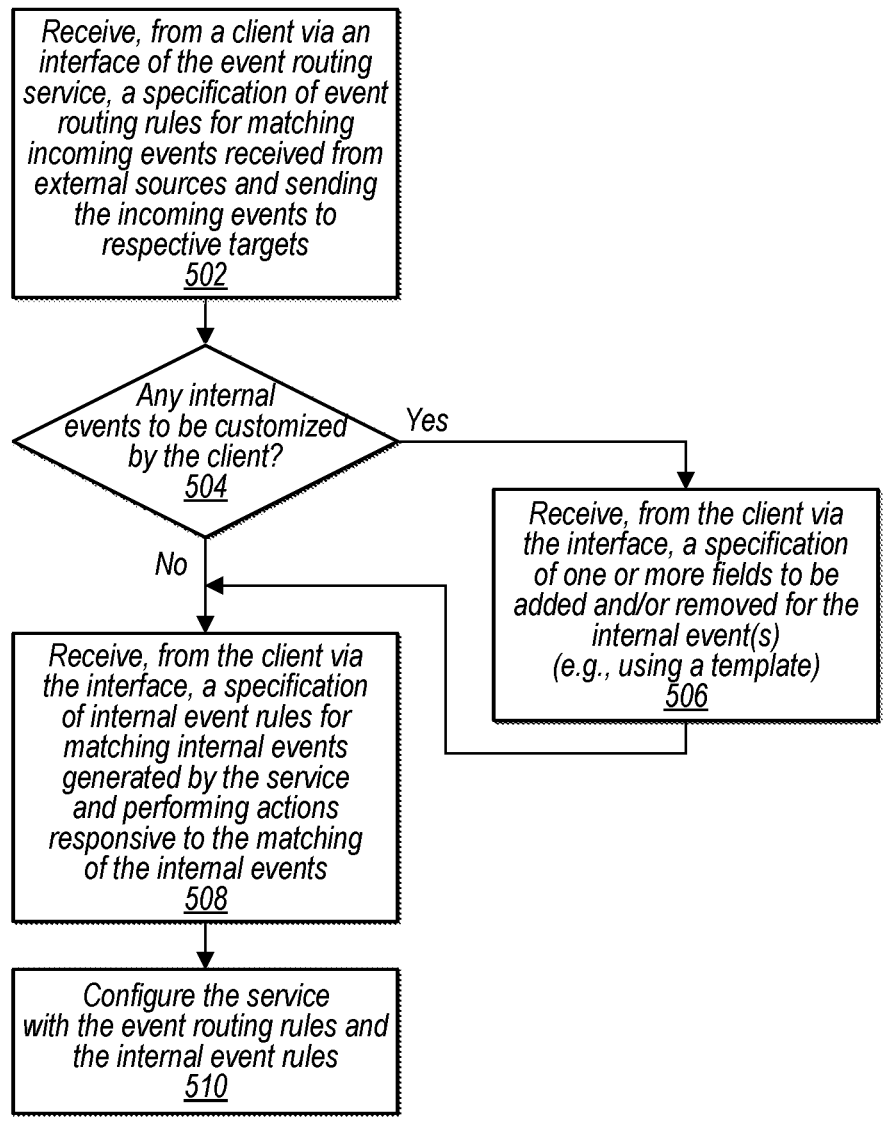
FIG. 5 is a high-level flowchart illustrating various methods and techniques to configure rules to implement lightweight reactive workflows through internal event generation and matching, according to some embodiments.

FIG. 5 is a high-level flowchart illustrating various methods and techniques to configure rules to implement lightweight reactive workflows through internal event generation and matching, according to some embodiments. In various embodiments, any of the functionality described for any portions of the flowcharts 5-6 may be performed by any of the components of FIGS. 1-4 and/or 7.

Figure 6:
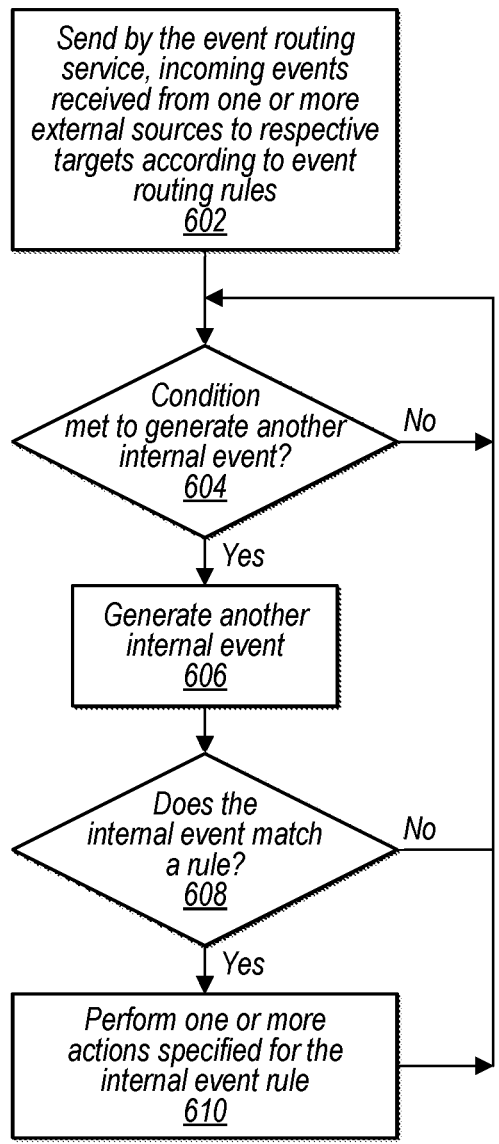
FIG. 6 is a high-level flowchart illustrating various methods and techniques to implementing lightweight reactive workflows through internal event generation and matching, according to some embodiments.

These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, a portion of or all of the techniques may be implemented by a provider network and/or a client device of a client network.

At block 502, a user receives, from a client via an interface of the event routing service, a specification of event routing rules for matching incoming events received from external sources and sending the incoming events to respective targets. At block 504, the service determines whether any internal event(s) are to be customized by the client (e.g., any number of internal events may be customized by the client in response to receiving an indication/selection of each internal event to be customized). If so, then at block 506, the service receives, from the client (e.g., from a user via the management interface) for each internal event to be customized, a specification of one or more fields to be included in the internal event(s). In some embodiments, the client may add and/or remove any number of fields to be included in the internal event by modifying a template (e.g., a default template that shows the default fields that exist for the internal event). The process then proceeds to block 508. If the service determines that no internal events are to be specified/defined by the client, then the process proceeds directly to block 508.

At block 508, the service receives, from the client via an interface, a specification of internal event rules for matching internal events generated by the service and performing actions responsive to the matching of the internal events. At block 510, the service configures itself with the event routing rules and the internal event routing rules (and any internal events, if specified by the client).

In some embodiments, the service will configure itself to only generate internal events that the client has created rules for. In other words, if the service does not receive form the client a specification of an internal event rule for matching one or more particular internal events, then the event routing service will not generate those one or more particular internal events. This will reduce the amount of computing/processing resources consumed by the service on behalf of the client and free up more resources to be available for processing any of the internal events that are used by the internal event rules that have been specified by the client. This may result in lowering the cost of running the service for the client, which may also allow the provider network to reduce the cost of using the service (saving the client on costs to use the service).

FIG. 6 is a high-level flowchart illustrating various methods and techniques to implementing lightweight reactive workflows through internal event generation and matching, according to some embodiments.

At block 602, the service sends incoming events received from one or more external sources to respective targets according to event routing rules of the service. At block 604, the service determines whether one or more conditions are met to generate an internal event. If not, then the process returns to block 602, where the service continues to process incoming events. If the service determines one or more conditions are met to generate an internal event, then the service generates the internal event at block 606.

At block 608, the service determines whether the internal event (or the internal event and one or more other internal events) match an internal event rule. In embodiments, the service may determine whether the internal event matches an internal event rule, routing rule, and/or any other type of rule. If not, then the process returns to block 602, where the service continues to process incoming events. If the service determines the internal event (or the internal event and one or more other internal events) match an internal event rule (or any other particular rule), then the service performs one or more actions specified for the internal event rule (or the particular rule) at block 610. The process then returns to block 602, where the service continues to process incoming events.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors.

The program instructions may implement the functionality described herein (e.g., the functionality of the event routing service, provider network, client network, and any other components described herein). The various methods as illustrated in the figures and described herein represent example embodiments of methods. The order of any method may be changed, and various elements may be added, reordered, combined, omitted, modified, etc.

Figure 7:
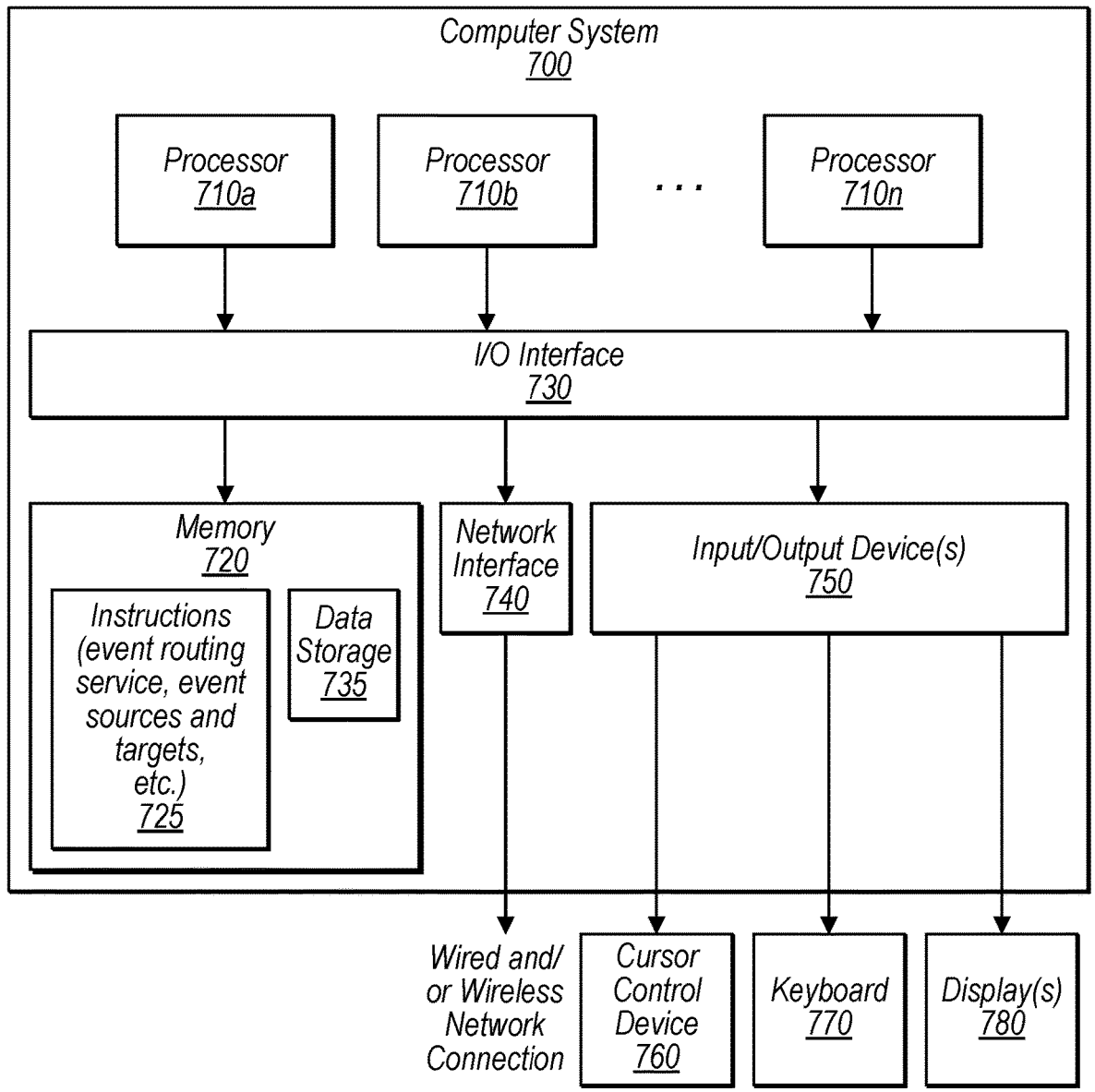
FIG. 7 is a block diagram illustrating an example computing system, according to some embodiments.

Embodiments implement lightweight reactive workflows through internal event generation and matching, which may be implemented using one or more of various systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the permissions management service, data management service, and any other components, etc.) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., incoming event routing rules, internal event rules, internal events, and any other configuration data, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement an event routing service for a plurality of clients, wherein the event routing service is configured to, for a given client:
receive, from a client via an interface of the event routing service, user input comprising a specification of event routing rules for matching incoming events received from one or more external sources and sending the incoming events to respective targets;

receive, from the client via the interface, user input comprising a specification of internal event rules for matching internal events generated by the event routing service and performing actions responsive to the matching of the internal events, wherein one or more of the internal events is generated based on processing of one or more of the incoming events by the event routing service;

send the incoming events received from the one or more external sources to the respective targets according to the event routing rules;

generate at least one of the internal events in response to a determination that a condition has been satisfied as a result of processing, by the event routing service, at least one of the incoming events to be sent to at least one target of the respective targets;

for a given internal event rule of the internal event rules:
- determine that the at least one internal event generated by the event routing service matches the internal event rule; and
- in response to the determination that the at least one internal event generated by the event routing service matches the internal event rule, perform at least one of the actions specified for the internal event rule.

2. The system as recited in claim 1, wherein the event routing service is further configured to:
- determine that one of the incoming events from one of the external sources was successfully delivered to a particular target of the respective targets; and
- in response to the determination that the incoming event was successfully delivered to the particular target, generate the at least one internal event.

3. The system as recited in claim 1, wherein the event routing service is further configured to:
- determine that delivery of one of the incoming events from one of the external sources to a particular target of the respective targets failed; and
- in response to the determination that delivery of the incoming event to the particular target failed, generate the at least one internal event.

4. The system as recited in claim 1, wherein the event routing service is further configured to:
- determine that one or more of the incoming events respectively match one or more of the event routing rules; and
- in response to the determination that the one or more incoming events respectively match the one or more event routing rules, generate the at least one internal event.

5. The system as recited in claim 1, wherein the event routing service is further configured to:
- determine that one of the incoming events does not match any of the event routing rules; and
- in response to the determination that the incoming event does not match any of the event routing rules, generate the at least one internal event.

6. A method, comprising:
performing, by one or more computing devices of a provider network that implement an event routing service:
- receiving, from a client via an interface of the event routing service, user input comprising a specification of one or more internal event rules for matching internal events generated by the event routing service and performing actions responsive to the matching of the internal events;
- sending incoming events received from one or more external sources to respective targets according to event routing rules of the event routing service;
- generating at least one of the internal events in response to determining that a condition has been satisfied as a result of processing, by the event routing service, at least one of the incoming events to be sent to at least one target of the respective targets; and
- for a given internal event rule of the one or more internal event rules:
  - determining that the at least one internal event matches the internal event rule; and
  - in response to determining that the at least one internal event matches the internal event rule, performing at least one of the actions.

7. The method as recited in claim 6, further comprising:
receiving, from the client via the interface, a specification of the event routing rules for matching the incoming events and sending the incoming events to the respective targets.

8. The method as recited in claim 6, further comprising:
receiving, from the client via the interface, a specification of one or more fields to be included in the at least one internal event to be generated by the event routing service.

9. The method as recited in claim 6, further comprising:
- determining that one of the incoming events from one of the external sources was successfully delivered to a particular target of the respective targets; and
- in response to determining that the incoming event was successfully delivered to the particular target, generating the at least one internal event.

10. The method as recited in claim 9, wherein performing at least one of the actions comprises one or more of:
- sending the incoming event, another of the incoming events, or another message to one or more other targets of the respective targets, or
- generating a new internal event.

11. The method as recited in claim 6, wherein the at least one internal event comprises a plurality of the internal events, and further comprising:
- determining that the plurality of internal events generated by the event routing service match the internal event rule; and
- in response to determining that the plurality of internal events generated by the event routing service match the internal event rule, sending one or more of the incoming events or another message to one or more of the respective targets.

12. The method as recited in claim 11, further comprising:
- determining that a plurality of the incoming events respectively match a corresponding one of the event routing rules; and
- for each of the plurality of incoming events that respectively match a corresponding one of the event routing rules, generate one of the plurality of internal events.

13. The method as recited in claim 6, further comprising:
- receiving a message from one of the respective targets; and
- in response to receiving the message, generating the internal event.

14. The method as recited in claim 13, wherein performing at least one of the actions comprises one or more of:

sending the incoming event to one or more additional targets of the respective targets, sending the message or the internal event to one or more additional targets of the respective targets, or sending another of the incoming events to the target or an additional target of the respective targets.

15. One or more non-transitory computer-accessible storage media storing program instructions that when executed on or across one or more processors of a host device of a provider network cause the one or more processors to implement an event routing service to:

receive, from a client via an interface, user input comprising a specification of one or more internal event rules for matching internal events generated by the event routing service and performing actions responsive to the matching of the internal events;

send incoming events received from one or more external sources to respective targets according to event routing rules of the event routing service;

generate at least one of the internal events in response to a determination that a condition has been satisfied as a result of processing, by the event routing service, at least one of the incoming events to be sent to at least one target of the respective targets; and for a given internal event rule of the one or more internal event rules:

determine that the at least one internal event matches the internal event rule; and in response to the determination that the at least one internal event matches the internal event rule, perform at least one of the actions.

16. The one or more storage media as recited in claim 15, wherein the instructions when executed on or across the one or more processors cause the one or more processors to implement the event routing service to:

receive, from the client via the interface, a specification of the event routing rules for matching the incoming events and sending the incoming events to the respective targets.

17. The one or more storage media as recited in claim 15, wherein the instructions when executed on or across the one or more processors cause the one or more processors to implement the event routing service to:

determine that one of the incoming events from one of the external sources was successfully delivered to a particular target of the respective targets; and in response to the determination that the incoming event was successfully delivered to the particular target, generate the at least one internal event.

18. The one or more storage media as recited in claim 15, wherein the instructions when executed on or across the one or more processors cause the one or more processors to implement the event routing service to:

determine that no incoming events have been received by the event routing service for at least a threshold period of time; and in response to the determination that no incoming events have been received by the event routing service for at least a threshold period of time, generate the at least one internal event.

19. The one or more storage media as recited in claim 15, wherein the instructions when executed on or across the one or more processors cause the one or more processors to implement the event routing service to:

determine that a number of attempts to deliver one of the incoming events to one of the targets has exceeded a threshold number; and in response to the determination that the number of attempts to deliver the incoming event the target has exceeded the threshold number, generate the at least one internal event.

20. The one or more storage media as recited in claim 15, wherein the instructions when executed on or across the one or more processors cause the one or more processors to implement the event routing service to:

determine that an acknowledgment of successful delivery of one of the incoming events to one of the targets has not been received for a threshold time period since the routing service sent the incoming event to the target; and in response to the determination that the acknowledgment of successful delivery of the incoming event to the target has not been received for the threshold time period since the routing service sent the incoming event to the target, generate the at least one internal event.

* * * * *